Feb. 8, 1938. T. QUERY 2,107,801
HEADLIGHT ATTACHMENT
Filed March 6, 1937
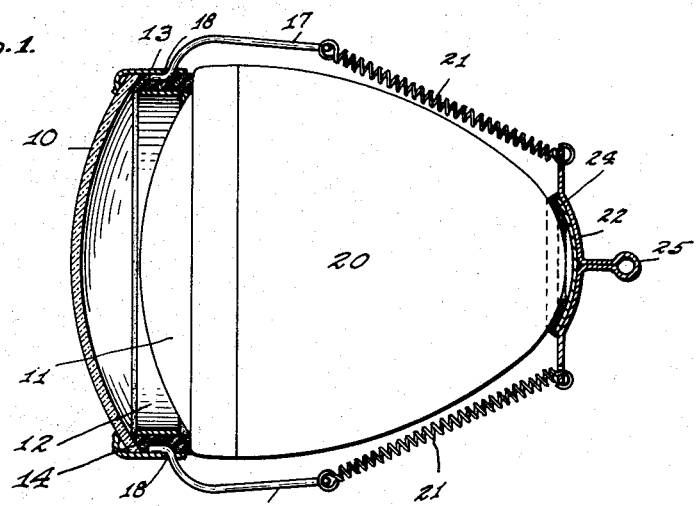
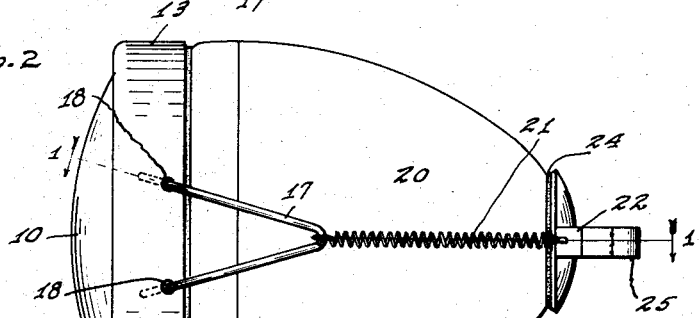
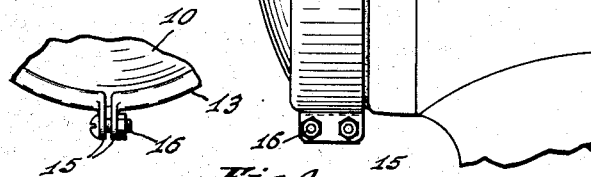
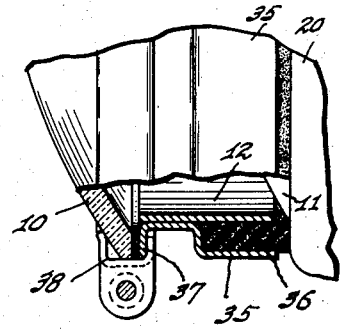
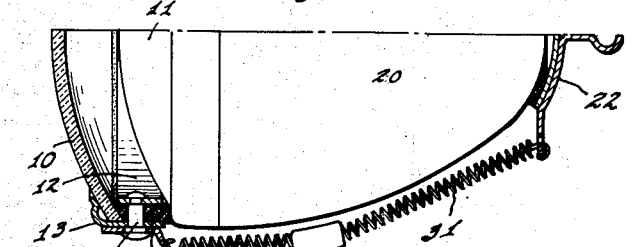
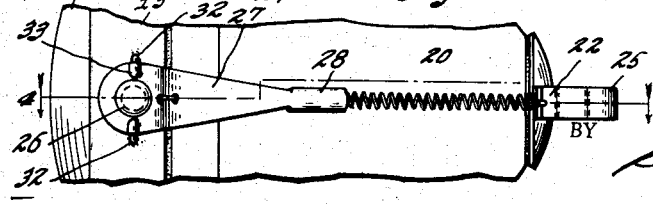
INVENTOR.
THURMAN QUERY,
BY
ATTORNEYS.

Patented Feb. 8, 1938

2,107,801

UNITED STATES PATENT OFFICE 2,107,801

HEADLIGHT ATTACHMENT

Thurman Query, Columbus, Ind.

Application March 6, 1937, Serial No. 129,295

5 Claims. (Cl. 240—48.4)

This invention relates to automobile headlights, and more particularly to a filter-glass and means for mounting it on such headlights.

It is well known that the ordinary white light of the usual automobile headlight is ineffective in some weather conditions, especially in fog or in a snow storm, by reason of the glare produced by reflection and diffusion of the light by the particles of water or snow. Amber-colored light has been found to give quite good illumination under these conditions, but is not as effective as the white light in clear weather.

It is the object of my invention to provide a headlight attachment which will support a filter glass, preferably of amber color, in front of the standard lens of an automobile headlight to modify the color of its light temporarily during weather conditions of poor visibility, to give better illumination during such conditions. It is particularly the object of the invention to provide a filter-glass attachment of inexpensive construction which may be quickly and easily mounted on or dismounted from an automobile headlight and will fit various sizes and shapes of headlight, which will not only modify the color of the light emitted by the headlight but will restrict the spread of such light at the marginal edges of the light beam, to reduce glare; in the use of which the space between the regular lens and the filter-glass will be sealed to keep out moisture or snow; and which will be constructed to avoid damage to the headlight.

The attachment comprises an annular frame having a filter glass in its forward end and adapted to fit against the front of the headlight and to cover its light-emitting area. The frame is supplied with rearwardly extending arms from which springs or other tension members extend to a cap adapted to fit over the rounded rear end of the headlight, by means of which the frame may be readily and securely mounted on any of various sizes and shapes of headlight.

The accompanying drawing illustrates the invention: Fig. 1 is a horizontal section on the line 1—1 of Fig. 2, showing an embodiment of the invention in place on a headlight; Fig. 2 is a side elevation of the structure shown in Fig. 1; Fig. 3 is a fragmentary front elevation of the structure shown in Figs. 1 and 2; Fig. 4 is a half-sectional view, on the line 4—4 of Fig. 5, of a modified embodiment of the invention; Fig. 5 is a fragmentary side elevation of the structure shown in Fig. 4; and Fig. 6 is a fragmentary side elevation of another modified embodiment of the invention, with parts broken away to show the frame in section.

In the preferred form of the invention, the filter glass 10 is mounted at the forward end of an annular frame of a size suitable to cover the exposed portion of the standard clear lens 11 which constitutes the light-emitting area of the headlight 20. The frame includes an inner cylindrical ring 12 of considerable axial extent, and an outside ring or draw-band 13, with an interposed band 14 of compressible material such as rubber. The forward edge of the draw-band 13 is turned inwardly to confine the filter glass 10 against the forward edge of the compressible material 14, which is sufficiently wider than the inner ring 12 and under sufficient radial compression that it overlies the forward edge of the inner ring 12 to prevent engagement of the filter glass therewith. While the outer ring 13 may be circumferentially complete, filter glass replacement is more convenient if it is made in the form of a draw-band, with lugs 15 at its ends through which pass one or more bolts 16 for drawing the band tight.

The compressible material 14 extends rearwardly from its line of engagement with the filter glass 10 ahead of the ring 12, between the ring 12 and the draw-band 13, and beyond their rearward edges, so that its edges respectively engage in sealing relationship the filter glass and the front of the headlight, to seal against escape of light and admission of moisture into the space between the regular lens 11 of the headlight and the filter glass 10, and to prevent marring the headlight.

For securing the frame in place, the outer ring or draw-band 13 is provided at each side with a pair of holes 18 through which extend the ends of a V-shaped wire arm 17. These ends are each bent to engage the rear edge of a hole 18 and extend forwardly along the inside of the draw-band 13, to hold the arms outwardly away from the sides of the headlight 20. Springs 21, or other tension members, extend from the free ends of the arms 17 to a member 22 which engages a rearward portion of the headlight 20. The member 22 may have a handle 25, and is conveniently cup-shaped to overlie the pointed or rounded rear end of the headlight 20. It should carry a cushion 24, which is preferably of annular form to accommodate differently curved headlight ends. The frame is thus held against the front of the headlight 20 by the tension of the springs 21 reacting against the member 22 which in turn bears against the rear end of the headlight.

The filter glass 10 may be of any desired color, but amber-colored glass has been found effective for satisfactory illumination in fog or snow, and this color is what I consider desirable. The filter glass need have no light diffusing or concentrating capacity, for it is intended primarily to alter the color of the light beam thrown by the headlight; but it is desirably curved, so that it will not interfere with curved headlight lenses. The frame is desirably of considerable axial extent, not only to assist in accommodating deeply curved headlight lenses, but primarily to form a short hood to restrict the light beam at its marginal edges.

In the modification shown in Fig. 4, the draw-band or ring 13 is circumferentially complete, and is held in proper relative position with respect to the inner ring 12 by rivets 26. A pair of diametrically opposite rivets may conveniently be used to attach the rearwardly extending arms to the lens frame, and the parts may be held in proper relative position by the use of shoulders on the rivets 26.

In Figs. 4 and 5 I have also shown a modified form of arm 27, made of sheet-metal. It is punctured at one end for the reception of a rivet 26 and is provided at the other end with ears which are bent inwardly to form a loop 28. A spring 31 passes through each loop 28 and is anchored at its forward end near the forward end of the arm 27 and at its rearward end to the member 22. This construction provides a longer spring than the modification of Figs. 1 and 2, to accommodate greater differences in the length of the headlights to which the device is adapted to be applied.

The connection between each arm 27 and the draw-band or ring 13 is desirably a pivotal connection, to permit the arms to be pivoted to a position generally co-planar with the ring 13, to facilitate storage. But this connection at the forward end of the arm 27 is also desirably provided with means for holding the arm in its rearward position. This holding means may conveniently consist of a pair of lugs 32 on the ring 13, disposed on opposite sides of the pivotal axis, and of correspondingly located raised portions 33 in the arm 27, into the concave under sides of which the lugs 32 fit.

In the modification shown in Fig. 6, the inner ring 12 of the auxiliary lens frame is surrounded by an intermediate ring 35 which is spaced from such ring 12 near its rearward edge, to provide a rearwardly opening slot for the reception of an annular gasket 36; and which engages the inner ring 13 over the remaining portion of its width and carries an outwardly extending flange 37 at its forward edge. The filter glass 10, with an intervening gasket, is pressed against this flange 37 by means of a narrow U-shaped draw-band 38.

In all of the modifications shown, the attachment may be mounted by placing the frame against the front of a headlight, and while holding the frame in this position, securing it in place by slipping the cup-shaped member 22 over the rear point of the headlight. The attachments are used in pairs, to fit pairs of headlights, and provide a convenient means for temporarily modifying the illumination given by the usual headlights to render them effective during conditions of fog or snow by eliminating the glare which accompanies the use of white lights under these conditions. Their rearwardly extending arms hold the springs away from the sides of the headlight; and by reason of their pivotal mounting permit convenient storage, so that a pair of them may be kept in an automobile and slipped in place whenever conditions require it and removed when such conditions are no longer present. Their gaskets effectively seal the space between the two lenses, which has been found to be of advantage; and prevent marring the finish of the headlight. The axial length of the frame constricts the beam of light which comes from the headlight, to aid in reducing glare, and accommodates deeply curved lenses with which some headlights are provided.

I claim as my invention:

1. An automobile headlight attachment, comprising an annular frame adapted to fit against the front of a headlight and encircle its light-emitting area, a filter glass in said frame, a member for engaging the rear end of the headlight, arms extending outwardly and rearwardly of said frame in position to avoid contact with the sides of the headlight, and tension devices extending between said member and the free ends of said arms.

2. An automobile headlight attachment, comprising an annular frame adapted to fit against the front of a headlight and encircle its light-emitting area, a filter glass in said frame, a member for engaging the rear end of the headlight, arms shaped to extend outwardly and rearwardly of said frame in position to avoid contact with the sides of the headlight, pivotal arm-mounting means on said frame including means to prevent inward movement of said arms from said outward and rearward positions, and tension devices extending between said member and the free ends of said arms.

3. An automobile headlight attachment, comprising an inner ring of considerable width, a band of compressible material encircling said inner ring and projecting beyond both its edges, an outer ring encircling said band and provided beyond the forward edge thereof with an in-turned flange, a glass disposed with its edges behind said flange and against the forward edge of said compressible material, a pair of rearwardly extending arms pivotally mounted on said ring structure on angularly-spaced radial axes, and means for engaging a rearward portion of the headlight and tension members extending between said means and said arms.

4. An automobile headlight attachment, comprising an inner ring, an outer ring having an axial portion spaced from said inner ring and a second axial portion contiguous therewith, a band of cushion material in the space between said two rings, an out-turned flange at the forward edge of one of said rings, a glass overlying said flange, means for securing said glass against said flange, a member for engaging a rearward portion of the headlight, and means including tension members connecting said member to said glass-supporting structure.

5. An automobile headlight attachment, comprising an inner ring, a band of compressible material encircling said ring and projecting rearwardly therebeyond, an outer ring encircling said band, a glass adjacent the forward edge of said inner ring, an in-turned flange overlying the edge of said glass and secured to said outer ring, and spring means for securing said glass-supporting structure against the front of said headlight.

THURMAN QUERY.